United States Patent [19]

Barny et al.

[11] Patent Number: 4,604,083
[45] Date of Patent: Aug. 5, 1986

[54] MACHINE FOR MANUFACTURING FOLDED BOXES

[75] Inventors: Jean J. Barny, Lausanne; Roger Roch, Cossonay-Ville, both of Switzerland

[73] Assignee: Bobst SA, Lausanne, Switzerland

[21] Appl. No.: 578,862

[22] Filed: Feb. 10, 1984

[30] Foreign Application Priority Data

Feb. 21, 1983 [CH] Switzerland .................. 944/83

[51] Int. Cl.⁴ .................................. B31B 49/00
[52] U.S. Cl. .................................. 493/34; 493/60; 493/28; 493/479; 493/55
[58] Field of Search .................. 493/34, 31, 342, 60, 493/344, 372, 28, 479, 55, 71

[56] References Cited

U.S. PATENT DOCUMENTS

| | | | |
|---|---|---|---|
| 3,371,585 | 3/1968 | Moser et al. | 493/31 |
| 3,611,884 | 10/1971 | Hottendorf | 493/479 |
| 3,882,764 | 5/1975 | Johnson | 493/34 |
| 4,323,098 | 4/1982 | Suzuki | 493/34 |
| 4,332,579 | 6/1982 | Johnson | 493/55 |

*Primary Examiner*—Lowell A. Larson
*Assistant Examiner*—David B. Jones
*Attorney, Agent, or Firm*—Hill, Van Santen, Steadman & Simpson

[57] ABSTRACT

A box making machine comprises a feed station, a positioning station, a printing station including four printing units, a cutting station with a creasing unit, a slotting unit and a cutting unit, a folding-gluing station and a stacking and delivery station, all driven by D.C. motors. The D.C. motors control is achieved by the electrical shaft coupling driven by a driving device which comprises a command control unit having a code generator, a synchronization circuit for each motor and a curved generator for one of the motors, a calculating unit including a microprocessor, input/output circuits and an input circuit with switches, a signal conditioning unit with an element for sense discrimination and multiplication, and a signal conditioner, and a command logic unit including a logic drive selection circuit, a logic starting circuit and a logic manual command circuit.

6 Claims, 16 Drawing Figures

MACHINE FOR MANUFACTURING FOLDED BOXES

BACKGROUND OF THE INVENTION

1. Field of the Invention

The present invention relates to a machine for manufacturing folded boxes with sheet material, and is particularly concerned with the drive of a machine which processes corrugated cardboard boxes, i.e. printing, creasing, cutting and folding such boxes.

2. Description of the Prior Art

The machines heretofore known generally process sheets, by printing and cutting the sheets, to manufacture folded and assembled, i.e. glued, boxes.

The first operation to be performed is the printing. Then comes the creasing of the longitudinal folding lines. It should be noted that sheets have already have transverse folding lines thereon. The third operation is the slotting of the front and rear edges of the sheet, in alignment with the folding lines, so that areas, which are to be folded and glued in order to form a box, are created around the sheet. In a fourth operation, holes to ensure ventilation or easy handling of the boxes are cut out of the sheet.

Normally these operations are performed by devices with tools working like mills.

Each printing unit includes a lower printing cylinder operating jointly with an upper pressure cylinder. The creasing elements are constituted by upper and lower tools mounted on four transverse shafts arranged in successive superposed pairs. A slotter unit, also having two pairs of superposed shafts on which the slotting tools are mounted, follows the creasing elements. The slotting tools comprise upper knives mounted around a cylinder and cylindrical lower counterparts facing the upper knives. The slotter can also be provided as well with tools for cutting the lateral edges of the sheets, as with tools for cutting the gluing flaps. The slotter could be provided with two transport bores arranged one above the other and located between the two pairs of superposed shafts to improve sheet transport.

The slotter is followed by a cutting station for special cuts on the blank, such as ventilation holes or handles. This cutting station comprises an upper tool-bearing cylinder acting on a lower angle cylinder made of steel. In certain cases, the anvil cylinder can be made of steel with an elastomer covering. For good transport of the sheets in this unit, conveying elments are mounted on each side of the lower and upper cylinders, as in the slotter.

The upper and lower shafts of the various units are driven by gears ensuring equivalent circumferential speeds for all elements which touch the sheets. There is a device for the angular setting of the slotting and cutting tools, with regard to the position of introduction of the sheets at the entrance of the units. Therefore, the tool-bearing cylinders are set in registration with the sheets to be processed.

The various printing, creasing, slotting and cutting tools are laterally shiftable along their respective shafts, so that they can process boxes of different widths and shapes. These shiftings are performed by moto-reductors driven by a central unit, into which, for example, various values can be registered, according to the size of the boxes to be manufactured. This central unit provides the required orders to the various moto-reductors.

The precreasing, creasing, slotting and cutting units are included in a machine ensuring the feeding, printing, folding and stacking of the different sheets. This type of machine, therefore, enables the manufacturing of a given amount of finished boxes depending on the length of the introduced boxes, and from the circumference of the slotting and cutting tools, for a given speed of the sheet transport. Moreover, as the mechanical driving of the various elements of the machine involves running inaccuracies, the register setting of the various elements is very difficult.

Because of these registration errors, a sheet cannot be processed with great accuracy, and the adjusting of one element with respect to another requires an expensive and complicated structure.

SUMMARY OF THE INVENTION

The object of the present invention is to provide a machine which does not suffer from the above-mentioned registration drawbacks and which noticeably improves the accuracy of the manufactured blanks.

The above object is achieved in a machine for manufacturing folded boxes with sheet material which comprises successive stations working in synchronism, the stations including a feed station, a printing station, a cutting station, a folding and gluing station and a piling-up and delivery station. The machine is characterized in that the feed station is provided with means to feed the machine with a pile of sheet material, means to center a pile of sheet material, means to square an upper sheet pack of the pile, and means to individually feed the uppermost sheet of the pile. The machine is further characterized in that a centering station is provided with means to center a sheet and means to sequentially feed a sheet into the printing station. The machine is further characterized in that the printing station comprises several printing units operable with printing cylinders located on the bottom of the printing units. The machine is further characterized in that the cutting station comprises two successive cutting units. One of the cutting units is mounted on means to enable its setting for in or out of operation. The folding-gluing station comrises a telescopic conveyor ensuring the transport of the sheets when the cutting unit is out of operation. The piling-up and delivery station is provided with counter-stacking means and pack conveying means. The elements of the stations are driven by D.C. motors commanded by a D.C. control and a control for the registration, data processing and programming. The elements of the stations are laterally shifted with asynchronous motors controlled by an A.C. control.

BRIEF DESCRIPTION OF THE DRAWINGS

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
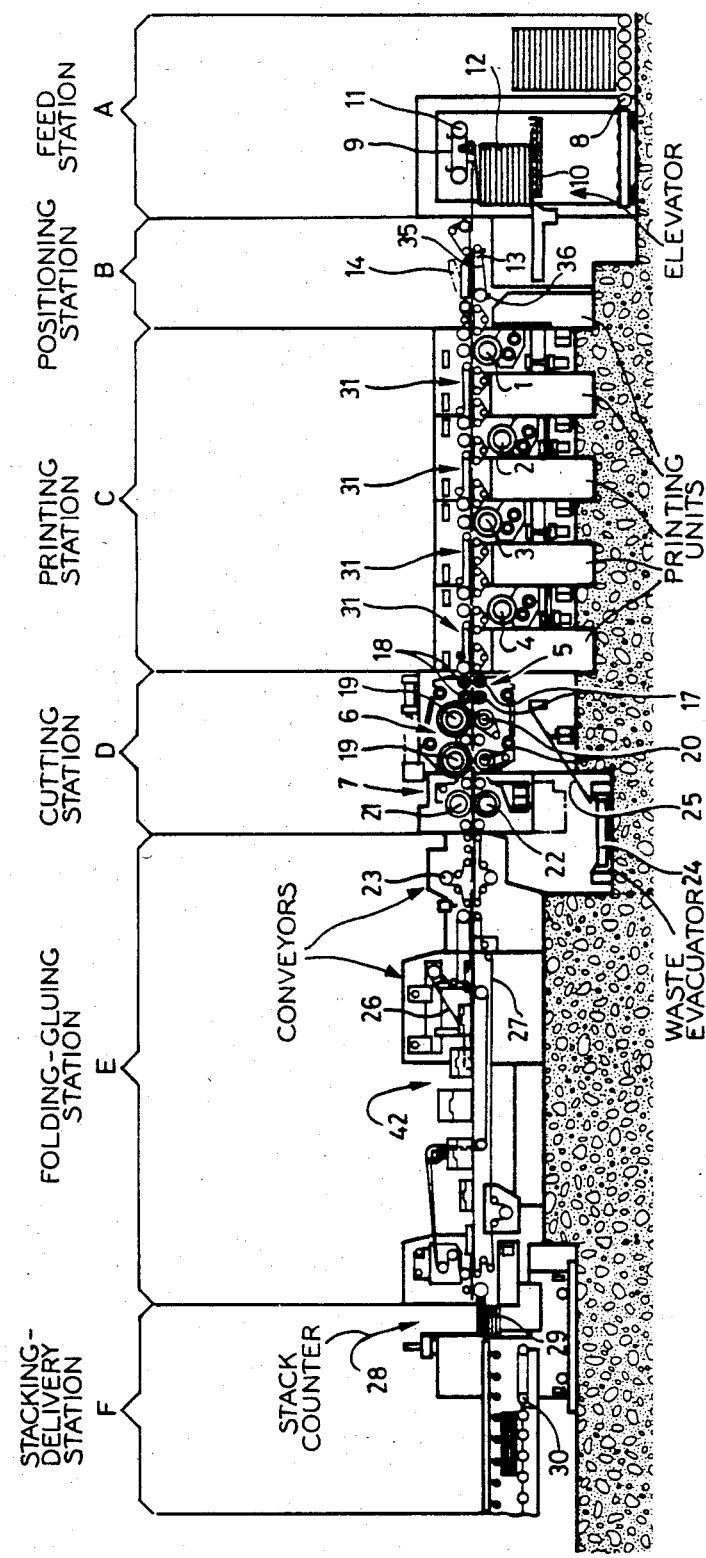
FIG. 1 is a schematic illustration of a machine for manufacturing boxes.

The machine for manufacturing boxes illustrated in FIG. 1 comprises a feed station A, a positioning station B for the corrugated cardboard sheet delivered by the station A, a printing station C comprising four printing units 1, 2, 3 and 4, a cutting station D having a creasing unit 5, a slotting unit 6 and a cutting unit 7, a folding-gluing station E, and finally a stacking and delivering station F.

The feed unit is constructed with a pile feed device 8 working in conjunction with a feeder 9 comprising a pile elevator 10 and a pusher 11 which takes off the uppermost sheet from the pile 12, in order to push the same in continuous cycles into the machine. The pile 12 introduced into the feed unit is first centered with respect to the median axis of the machine by way of lateral stops, then its upper sheets are squared with front and side stops, and advanced to the positioning station B. The sheet positioning station B is provided with a register chain and push lugs 13 ensuring the sequential advance of the sheets, so that the sheets are driven in registry with the printing plates mounted on the printing cylinders of the printing station C. The push lugs 13 work in conjunction with lateral guides (not shown) ensuring the proper positioning of the sheet, with respect to the median reference line 32 (FIG. 1b). An ejection device eliminates the damaged or inadequate sheets. The same is located in the positioning station B.

FIG. 1 illustrates that if some printing units are not needed they are set out of order. Here, the printing stations 2 and 4 are not working and have been lowered to the non-operating position.

In order to warrant the accurate transport of the sheets, a pressure roller 15 takes the place of the previously occupied printing cylinder. The roller 15 is mounted on a longitudinally-shiftable lever arm. Therefore, set out of order, the printing unit can be prepared for a new job without stopping production.

The creasing unit 5 of the cutting station D comprises two successive creasing elements. Each element is constructed of a lower cylinder 17 and an upper cylinder 18. The upper cylinder 18 is provided with creasing tools and the lower cylinder 17 is provided with the usual counterparts. The slotter 6 comprises two successive slotting units constructed of a tool-bearing upper cylinder 19 facing a lower, grooved cylinder 20.

The slotting unit 6 is followed by a cutting unit 7 having an upper tool-bearing cylinder 21 facing a lower anvil cylinder 22. The cutting unit 7 is mounted in such a manner that it is lowered when set out of order, as illustrated in broken lines in FIG. 1. If the work is to go on without using the cutting unit 7, the spare space it frees behind the slotting unit 6 will be occupied by a telescopic conveyor 23. As soon as the telescopic conveyor 23 is properly positioned, the adjusting, setting and positioning of the new tools on the upper tool-bearing cylinder 19 of the cutting unit 7 can be achieved while the machine is in production. The cutting station D also comprises a waste evacuator 24 located beneath the sliding and cutting units 6 and 7.

The folding-gluing unit E comprises, in addition to the telescopic conveyor 23, several lower belt conveyors 26 and upper belt conveyors 27 extending side-by-side. These upper and-lower belt conveyors 26, 27 ensure the transport and the folding of the blanks produced by the cutting station D. The telescopic conveyor 23 fills the spare space between the cutting unit and the folding-gluing station E, when the cutting uhit 7 is lowered and set out of order (as illustrated in broken lines in FIG. 1). A blank gluing device (not shown) is arranged at the starting area of the upper and lower endless belt conveyors 26 and 27. The stacking and delivery station F follows the folding-gluing station E. It is provided with a counting-piling-up device 28 which delivers packs 29 with a given number of folded blanks to a pack conveyor 30 which transfers the packs 29 to a bundling machine (not shown).

Figure 1A:
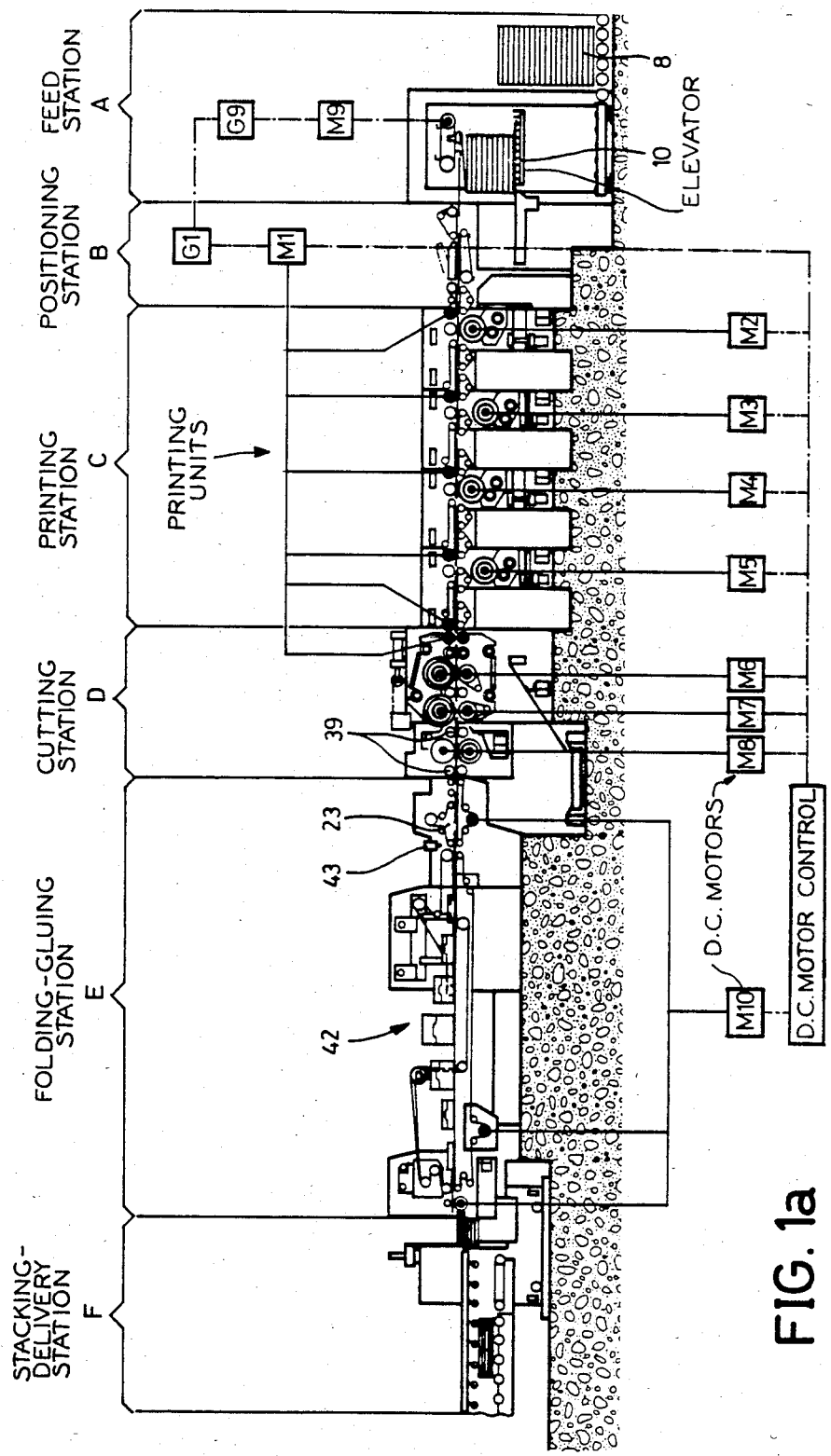
FIG. 1a is a schematic illustration of the main sequential operation of the machine of FIG. 1.
Figure 1B:
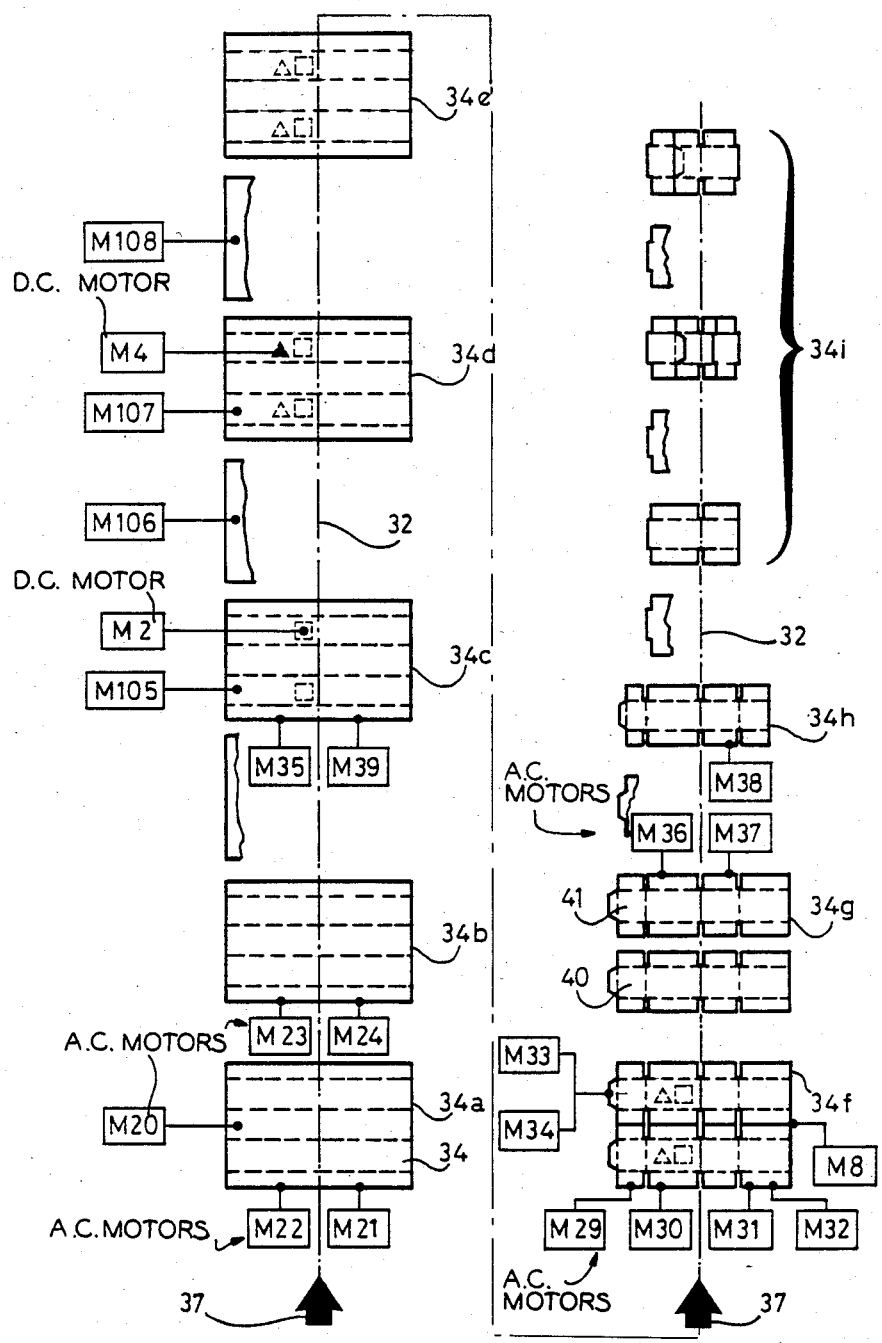
FIG. 1b is a schematic illustration of the sequential operation of the lateral shiftings of the various elements.

FIG. 1a illustrates the sequential operation of the machine. Only the main guide motors are illustrated. FIG. 1b schematically illustrates the operational chain for the lateral shifting of the machine elements, as well as the various positions of a sheet being processed in the successive stations of the machine. The motors demanding the pile feeding device 8 and the pile elevator 10 are not illustrated on the drawing. The command motor of the pusher 11 in the feeder 9 is a motor M9. The command motor of the positioning station B is a motor M1, which also commands the lower and upper cylinders 17, 18 of each creasing unit. The motor M1 also drives the lower and upper conveyors 31 of each printing unit 1, 2, 3 and 4. The printing units are commanded separately, i.e. a motor M2 drives the printing unit 1, a motor M3 drives the printing unit 2 a motor M4 drives the printing unit 3 and a motor M5 drives the printing unit 4. The slotting unit 6 is driven by a pair of motors M6 and M7. The motor M6 drives the upper tool-bearing cylinder 19 and the lower, grooved cylinder 20 of the first slotter, while the motor M7 drives the upper tool-bearing cylinder 19 and the lower, grooved cylinder 20 of the second creasing unit of the slotting unit 6. The upper tool-bearing cylinder 21 and the anvil cylinder 22 of the cutting unit 7 are driven by a motor M8. The folding-gluing station E and the stacking and delivery station F are driven by a motor M10.

FIG. 1b illustrates the operations required for lateral setting of the various stations according to sheet width. The lateral setting is based on a median line 32. FIG. 1b also illustrates the motors to be used for the length registration in the printing, slotting and cutting operations. The sheet 34 is illustrated along its run in the machine. Its various locations are more specifically referenced 34a–34i. In the feed station A, the upper sheets of the pile 12, indicated at 34, are squared against lateral guides, one of which is actuated and the other of which is fixed. The location of these guides or stops is to be set according to the width of the sheet to be processed. To this end, two motors, i.e. a motor M21 for the fixed stop and a motor M22 for the actuated stop are employed. The setting with respect to the sheet length is performed by a motor M20 which shifts the feeder 9 forward or backward on its frames having a rear stop. The feeder 9 and the stops are therefore set simultaneously. In the positioning station, the sheets indicated at 34b are accelerated, then precisely aligned on their rear edges, in order to register with respect to one another, by way of chain register and push lugs 13 (FIG. 1). Simultaneously, the sheets are again aligned laterally, so that they are finally perfectly positioned with respect to the median line 32. The chain and push lugs register 13 comprises two conveyors having grooved belts 35 (FIG. 1) provided with fingers 36 mounted on two laterally-shiftable supports driven by a motor M23 for the left conveyor with respect to the direction of the arrow 37 and a motor M24 for the right conveyor with respect to the same direction. The lateral alignment of the sheet is achieved by a fixed guide on the frame of the right conveyor and by a guide mounted with springs on the left conveyor. Therefore, by laterally setting the right and left conveyors, one also achieves the setting of the sheet alignment elements. In the positions 34c and 34d, the sheet 34 is lying in the printing station C. The sheets are shifted separately from one printing unit into the other by lower and upper conveyors 31 (FIG. 1) arranged against a common slide moving transversely along cylindrical bars. The left lower and upper conveyors 31 are laterally set by a motor M35, whereas the right upper and lower conveyors are laterally set by a motor M39. If the printing is to be extended on the entire lower face of the sheet, the sheet cannot be carried by the lower conveyors. In such a case, the sheet is to be pressed against the upper conveyors by a device which creates a vacuum. Eah printing unit 1–4 is provided with such a device. The engraved cylinder of each printing unit 1–4 can also shift laterally in order to register the prints of the various printing units. For this purpose, the cylinder is mounted on bearings, which bearings are laterally shifted by a plurality of motors M105, M106, M107 and M108, respectively connected with the printing units 1, 2, 3 and 4. The registration of the printing units 1–4 is controlled by an electrical circuit which modifies the angular position of each motor M2–M5 (FIG. 1a) driving such units.

In the cutting station D, the lower and upper cylinder 17, 18 of each creasing unit are provided with lower and upper creasing tools, as well as with flap-forming tools. There are five lower and upper creasing tools and flap-forming tools, mounted side-by-side on the entire width of the machine on a first creasing shaft, called the pre-creasing shaft, and four tools on the second creasing shaft. They must, of course, be laterally adjustable, so that they can process various sheet sizes for various kinds and sizes of box blanks.

Therefore, the lower and upper creasing and pre-creasing tools arranged along the median line 32 are definitely set, whereas the upper and lower creasing and pre-creasing tools, located on both sides of the line 32 are laterally shiftable with respect to the location of the creasing to be achieved. The lower and upper pre-creasing tools, as well as the tool positioned exactly on the median line 32 and the flap-former, are arranged with two pre-creasing tools on the left and one flap-former on the right. A motor M31 achieves the positioning of the right pre-creasing tool, and a motor M32 sets the right flap-former. The first left pre-creasing tool is set by a motor M30, whereas the setting of the second right pre-creasing tool and the flap-former connected therewith is achieved by a motor M29. Four creasing tools are to be mounted on the creasing shaft and are aligned with the pre-creasing tools. These tools are shifted laterally by the motors also used for the setting of the pre-creasing tools, i.e. the motors M29, M30 and M31.

The cutting station D also comprises two slotting units, each comprising an upper tool-bearing cylinder 19 and a lower-grooved cylinder 20 (FIG. 1). The first slotting unit is provided with three sets of slotting tools and another set, constructed of a slotting tool and two flap-cutting tools. The second slotting unit is provided with a set including a slotting tool, with two flap-cutting tools and three sets of slotting tools having a circular knife. The lateral arrangement of these various tools on the respective shafts is identical to the tool arrangement of the creasing units. Therefore, the same motors 29–32 ensure the lateral shiftings of all pre-creasing, creasing and first and second cutting tools. The slotting tools are also angularly shiftable on the circumference of their respective tool-bearing cylinders, by way of a motor M33 for the tools of the first slotting unit and by way of the motor M34 for the tools of the second slotting unit. This angular shifting permits the accurate location of the slots.

Figure 2:
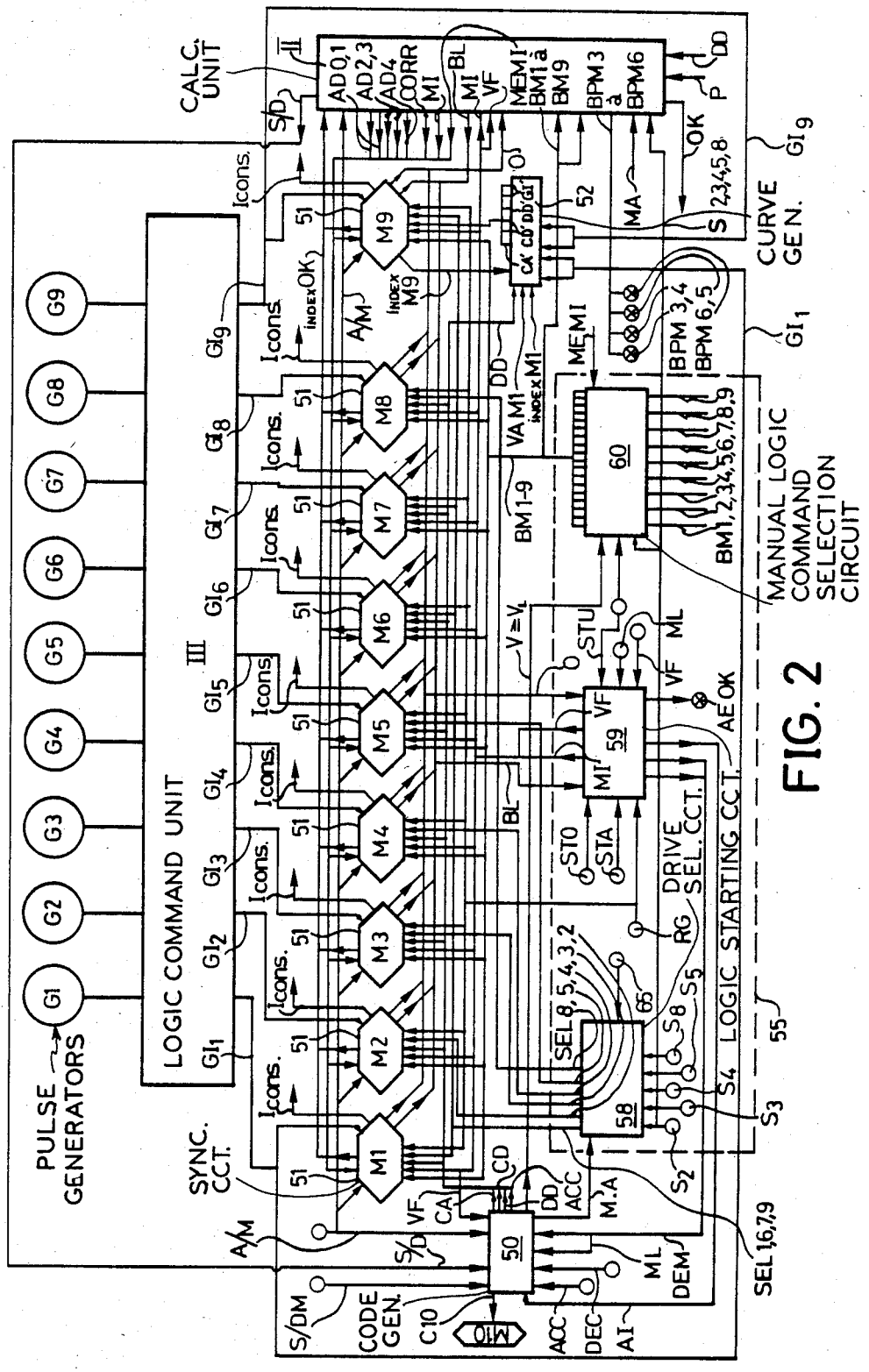
FIG. 2 is a schematic illustration, in block diagram form, of the driving devices of the motors.

Refering again to FIG. 1b, the position of the sheet is indicated by the reference 34f. In FIG. 1, in its working position the cutting unit 7 following the two slotting units is actuated separately by the motor M8 (FIG. 2), which is set and registered with respect to the speed of the other members of the machine. When the cutting unit 7 is out of order, the motor M8 becomes independent and is driven by an auxiliary command. The cutting unit 7 constructed of the upper tool-bearing cylinder 21 and the lower anvil cylinder 22 is located between the two pairs of driving shafts 39 (FIG. 2). The upper tool-bearing cylinder 21 comprises a transverse groove into which a tool bearer with a transverse knife is mounted. It is also provided with a range of tapered holes for mounting the cutting tools. The lower anvil cylinder 22 is mounted on two bearings vertically shiftable by way of hydraulic jacks, so that it can be lowered, in case of a jam for example. This vertical shifting of the lower anvil cylinder 22 also permits the accurate setting of the spare space between its surface and the transverse knife. Moreover a mechanical device permits the shifting of the transverse knife in such a way that it faces exactly a longitudinal groove on the lower anvil cylinder 22, when the knife is not used. Therefore, the transverse knife does not work with the lower anvil cylinder. The useless wearing of the knife is therefore avoided. Jacks lifting or lowering the entire element set the frames bearing the lower anvil cylinder. Depending on particular sheet size conditions, the transverse knife can cut the sheet into two halves, thus doubling the output of folded boxes. Electrical securities prevent erroneous manipulation of all these elements. The reference 34g illustrates the position of the sheet in the cutting unit 7. The slots have already been cut and the sheet is parted into two blanks 40 and 41 by the transverse knife.

The blanks 40 and 41 illustrated at 34g are inserted into a folder-gluer 42 (FIGS. 1 and 1a) by a conveyor 23. The conveyor 23, combined with the folder-gluer 42, constitutes the folding-gluing station E. The upper and lower belt conveyors 26 and 27 and the conveyor 23 are supported by two bars facing one another, one on the right and one on the left of the direction of sheet travel illustrated by the arrow 37. These two bars are to be set laterally according to the foldings requested on the blanks 40 and 41, shown as they are folded at 34i. The flaps of the box blanks 40 and 41 are folded one above the other by the upper belt conveyors 26.

The linear speed of one of the upper and lower conveyors 26, 27 is adjusted to the folding conditions by way of a speed control which lowers or increases the speed at request. The folding-gluing station E is driven by a motor M10, the speed of which is adjusted to the cutting conditions, i.e. if the machine is processing two half sheets, for example. In such a case, the working speed is to be increased by approximately 15% of the normal working speed, and the blanks 40 and 41 are then separated at the output of the cutting unit 7. The folding-gluing station is provided with a gluing device 43 (FIG. 1a) at the beginning of the folder-gluer 42. The right and left bars are to be positioned with accuracy by shifting the right bar with a motor M37 and the left bar with a motor M36. The lateral positioning of the gluing device 43 is performed by a motor M38 (FIG. 1b). All the shiftings are controlled by the central control unit of the machine. Limit switches prevent any erroneous manipulation of the machine. At the output of the gluing station E, the folded blanks 40 and 41 are counted and stacked in packs in the stacking and delivery station F. The piles are then transferred to a bundling machine and stopped or dispatched. The motors M1-M10 are all D.C. motors, whereas the motors M20-M24 and M29-M38 are A.C. motors. The machine is provided with a register control device, which warrants an accurate positioning of each sheet at the entrance of the stations A-F.

Figure 3:
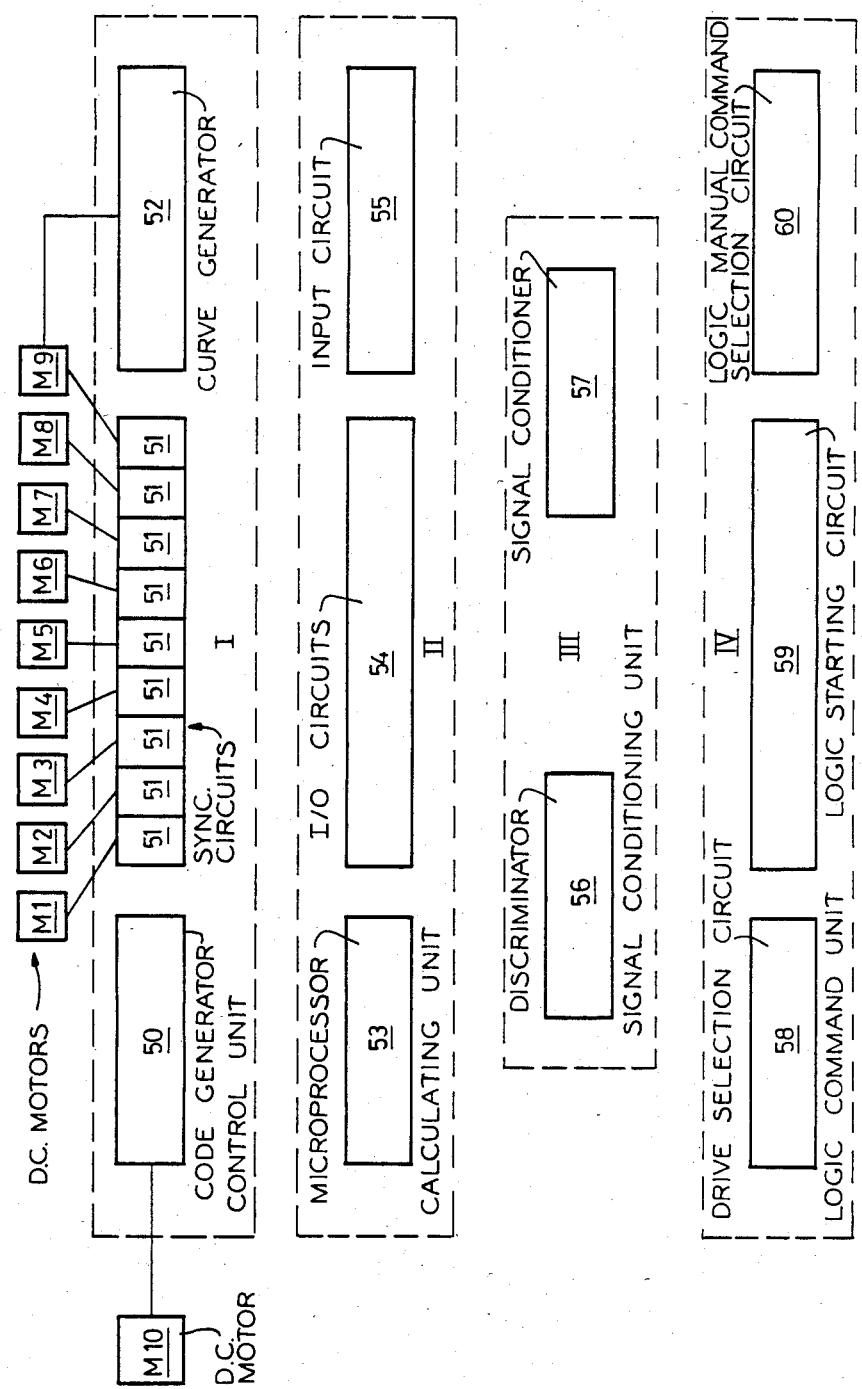
FIG. 3 is a schematic illustration of the elements of the driving device.

FIG. 2 illustrates the drive control, and particularly the control of the motors M1-M10. The motors M20-M24 and M29-M38 are commanded by a microprocessor, which processes the data regarding the sheet width and lateral positioning of the creasing and slotting. As illustrated in FIG. 3, the driving control of the motors M1-M9 includes a control unit I comprising a code-generating circuit 50, a synchronization circuit 51 for each motor M1-M9, a curve-generating circuit 52 for the motor M9, a calculating unit II comprising a microprocessor 53, input and output circuits 54, an input circuit with interruption control 55, a signal conditioning unit III including a sensed discrimination element 56 multiplying by four pulses generated by the pulse generators G1-G9 of FIG. 2 for the motors M1-M9, as well as a conditioner 57 for the interphasing and the conditioning of all signals between the machine and the units I and II, and a logic command unit IV of the machine including a driving selection circuit 58 and a logic manual command selection circuit 60. The motor M10 is controlled directly without a synchronization circuit code C10 produced by the code generator 50, with respect to the single or double cutting mode.

The operation of the various elements is described with reference to FIG. 2.

The code generator 50 produces an analog speed code CA, a digital rotation code CD, a digital shifting code DD with respect to the manual or automatic operating mode, an analog acceleration code ACC and a signal $V \geq VL$ for the manual command circuit 60. The code generator 50 includes a counter/decoder which memorizes the operating speed of the machine. This operating speed can be increased or reduced at request. The code generator 50 also includes an analog/digital converter for converting the digital speed reference into an analog speed reference. The code generator 50 is also provided with a curve generator so that an analog speed code CA is produced without any acceleration jerk. The analog acceleration code ACC is also delivered by the curve generator. The code C10 for the motor M10 is derived from, for example, the single or double size mode of the machine. The information on the single/double cutting mode S/D is generated by the calculating unit II. The code generator 50 also comprises a tension/frequency converter driven by the analog speed code CA to produce the digital rotation code CD, as well as a frequency generator driven by an automatic/manual control line to generate the digital shifting code DD. The code generator is also provided with a comparator for producing the information $V \geq VL$ for the logic manual command circuit 60. In short, the information fed into the code generator 50 is:

(a) One S/DM signal establishing manually a single or double operating mode;

(b) A signal S/D generated by the calculation unit II preestablishing automatically the single or double size operating mode;

(c) A signal A/M for the manual or automatic mode selection;

(d) Signals AI for instant stop;

(e) Acceleration signals ACC;

(f) A deceleration signal DEC;

(g) Slow working signals ML; and (h) Starting signals DEM.

The code generator 50 produces a plurality of signals CA, CD, DD and ACC, the signal V VL already mentioned above, and the signal MA, i.e. machine stopped signal for the analog circuit of the driving selection circuit 58.

The synchronization circuits 51 constitute the second element of the control unit I. Each circuit 51 includes an adder which delivers a current code $I_{cons}$. The current code $I_{cons}$ is calculated by the adder on the basis of a dual code delivered by a speed regulator combined with an analog acceleration code ACC produced by the code generator 50. Each synchronization circuit 51 has a speed adjusting loop, with a feedback from a speed measurement device based on the pulses of the pulse generator G1-G8 of each motor M1-M8. The speed code can result from the combining of the analog speed code CA, the speed correction signal CORR calculated by a position regulator, and a positive or negative internal speed reference. Each synchronization circuit 51 is also provided with a position-regulating loop ensuring the angular synchronization. This loop comprises a counter/decoder, a digital/analog converter and a position decoder, an analog/digital converter and a position regulator. The synchronization circuit is also provided with a command logic for the calculation of the required operations on the basis of the received orders.

The third element of the command unit I is a curve generator 52 comprising a binary counter/decoder, a memory, a multiplier, a divider and a command logic circuit. The binary counter/decoder is incremented by the positive pulses of the pulse generator G1 and deincremented by the negative pulses of the pulse generator G1 of the motor M1. These pulses have previously been treated by the conditioning unit III for the signals.

The memory maintains the curve shape characteristics to be followed by the movement of the motor M9. The multiplier calculates the speed code for the motor M9 and the divider adapts the incremental value of the pulse generator G9 of the motor M9 to the advance increment of the digital code CD' generated by the memory. The command logic controls the generator 52, while the shaft connecting the motor M1 to the generator G9 is coupled. Therefore, the respective signals entering the curved generator 52 are:

(a) The digital shifting signal DD delivered by the code generator 50;

(b) The analog speed of the motor M1 (VAM1) coming from the synchronization circuit 51 of the motor M1;

(c) The correct index setting indication of the motor M1 (index M1) of the synchronization circuit 51 of the motor M1;

(d) The positive or negative pulses GI$_1$ provided from the pulse generator G1;

(e) The corect index setting of the motor M9 (index M9); and (f) The positive or negative pulses generated by the pulse generator G9.

The signals produced by the curve generator 52 are:

(a) The processed positive or negative pulses GI' of the pulse generator G9;

(b) The processed digital shift signals DD';

(c) A digital code C'; and (d) An analog code CA'.

All of the signals generated by the curve generator 52 are transmitted to the synchronization circuit 51 of the motor M9.

The calculating unit II comprises a microprocessor 53 which commands the following functions:

(a) Control of the equivalence of the programmed values and the actual state of the elements of the machine;

(b) Prepositioning the motors M1–M9 when the job is changed or after the interruption of the shaft connecting the motors;

(c) Angular correction of the motors M1–M9 by either actuation of a push button or by sheet register control units; and (d) Control of the correct operation of the motors M1–M9.

The control mentioned under (a) above concerning the equivalence of the programmed values and the actual state of the elements of the machine must take place each time the job is changed. Therefore, the operator provides production data, i.e. the size of the box to be manufactured, the lateral positioning of the various tools, the list of the operating printing units and the information concerning the working or not working of the cutting unit by way of a console. This information belongs to the data base to be transmitted to the microprocessor 53 of the calculating unit II, as soon as the pre-positioning orders of the D.C. motors M1–M9 or the A.C. motors M20–M24 and M29–M39 have been given. On the other hand, the microprocessor 53 receives information from the input lines of the logic selection driving circuit 58 of the motors M1–M9. A pre-positioning order is provided by the console or by the index setting signal generated by the logic starting circuit 59. The microprocessor 53 then compares the list of the motors with the list of the effectively-selected motors, and announces any registered difference to the command console so that a message can be displayed on a screen.

The operation under (b) above concerning pre-positioning occurs when the machine working conditions are modified, i.e. if a new blank of different size is to be manufactured. To this end, the data base memorizing the information about a given job contains a value for every D.C. motor M1–M9, calculated by the command console on the basis of the geometrical dimensions of the box to be processed. During production, this value represents the actual angular phases of the motors M1–M9. This effective phasing is defined as the initial angular phasing increased by the sum of the angular correction registered from the start of the job. This operation can be reqested by the command console by way of a menu switch, or with a signal provided from the general index setting signal. The pre-positioning comprises detecting the "index OK" signal of the synchronization surface 51 of the motors M1–M9, then performing an angular correction of the phasing of the motors M1–M9 corresponding to the value previously memorized in the data base which stores the data of a given job. A pre-positioning routine checks if the selected motors corresponds to the programmed units, and if the list of the "index OK" signals corresponds to the list of the selected units. There is a deadline for performing this routine.

The function (c) of angular correction mentioned above with respect to the motors M1–M9 occurs while the machine is operating. To this end, five lines AD-0–AD4 permit the recognition of the synchronization circuits 51 of the motors M1–M9 where the correction is to be made and determine the direction of correction, and a line CORR which receives a pulse, the length of which is proportional to the magnitude of the correction from the microprocessor 53 of the calculation unit II. During this pulse, the digital shifting signal DD produced by the code generator 50 is transmitted to the given synchronization circuit 51.

The maximum value the correction represents a complete revolution of a motor M1–M9. This allows the positioning of a motor to any angular value with a single correction routine. After the transmission of the correction, the routine resets the data base of the microprocessor 53. The correction routine is called by an order generator by the command console (index setting), or at the request of one of the register control units 66 and 67 (FIG. 4) for the register error correction. The correction routine can also be called by one of the command console push buttons 68 (FIG. 4) for manual correction.

The function (d) mentioned above concerning the control of the correct operation of the motors provides that the microprocessor 53 of the calculating unit II is provided with an "overflow" signal. If this signal is actuated, the microprocessor 53 immediately checks the input values "index OK" of all of the selected synchronization circuits 51 in order to determine which circuit, or circuits, have failed, and to display the information at a terminal. The calculating unit II receives the following data:

(a) The selection codes of the motors M2, M3, M4, M5, M8 with references S$_2$, S$_3$, S$_4$, S$_5$, S$_8$ which are generated at the input of the logic drive selection circuit 58;

(b) The "machine stopped" signal MA produced by the code generator 50;

(c) The push-buttons "out of order" signals BPM3–BPM6;

(d) The digital shift code DD produced at the output of the code generator;

(e) The "index setting" signal MI and the "empty sheets" signal VF, both generated by the synchronization circuits 51 of the motors M1–M9;

(f) The "overflow" signal O generated by the synchronization circuits 51 of the motors M1–M9;

(g) The automatic/manual mode signal A/M generated by the command console;

(h) The "index OK" code generated by the synchronization circuits 51 of the motors M1–M9; and (i) A signal P produced by the pulse generators GIAC of the motors M20–M24 and M29–M39 for the lateral positioning of the machine elements.

The data issued by the calculating unit II are:

(a) A reference for the single/double size S/D transmitted to the code generator 50;

(b) A microprocessor OK code, also sent to the code generator 50;

(c) A locking signal BL;

(d) An index memorization signal MEMI;

(e) An "index setting" order MI;

(f) A correction signal CORR; and (g) Four addressing signals AD0–AD3 and a correction signal AD4, all being transmitted to the synchronization circuits 51 of the motors M1–M9.

The signal conditioning unit III receive data from the pulse generators G1–G9 of the motors M1–M9, which data are transformed into signals $GI_1$–$GI_9$, and thus into the synchronization circuits 51 of each motor M1–M9.

The data entered into the logic driving selection circuits 58 are:

(a) The selection codes $S_2$, $S_3$, $S_4$, $S_5$ and $S_8$ of the motors M2, M3, M4, M5 and M8;

(b) The "machine stopped" signal MA produced by the code generator 50; and (c) A signal generated by a push button 65 which electrically uncouples the shaft and resets the motors M1–M9 to the initial conditions.

The values produced by the logic driving selection circuits 58 are:

(a) Selection orders SEL1, 6, 7, 9 for the synchronization circuits 51 of the motors M1, M6, M7 and M9; and (b) The selection orders SEL2, 3, 4, 5, 8 addressed to the synchronization circuits of the motors M2, M3, M4, M5 and M8.

The logic command unit IV also includes the logic starting circuit 59 which performs the following operations:

(a) A start signal;

(b) Machine emptying if sheets are remaining;

(c) Slow running; and (d) Normal running.

The start signal is a "hoop" actuated by any push-button for starting the machine. The emptying order, if sheets are remaining in the machine, works independently of the connection or disconnection of the electrical shaft of the motors M1–M9. This order then calls in the "slow running" signal from the code generator 50 and actuates the signal VF (emptying of the remaining sheets) for the synchronization circuits 51. A slow or normal running order can call in the function (b), index setting of the motors M1–M9, depending on the connection or disconnection of the electric shaft of the motors. The running mode can be changed from slow to normal or vice-versa, without stopping the machine.

The data entered into the log starting circuit 59;

(a) The signals STO provided from the "stop" push-buttons of the machine;

(b) The signals STA provided from the "start" push-buttons of the machine;

(c) The signal BL locking the electrical shaft of the motors M1–M9 if something goes wrong;

(d) The signal O indicating the interruption of the electrical shaft (synchronization out or lost);

(e) The emergency stop signal STU;

(f) The slow running signal ML;

(g) The machine emptying signal VF; and (h) The general resetting signal RG restoring the initial conditions.

The data generated by the logic starting circuit 59 are:

(a) A start signal DEM, a slow running signal ML and an instant stop signal AI, all transmitted to the code generator 50;

(b) A signal AE OK indicating that the electrical shaft is all right; and (c) The index setting signals MI and the machine emptying signals VF, both transmitted to the synchronization circuits 51 of the motors M1–M9 and to the calculating unit II.

The third element of the logic command unit IV is the logic manual command selection circuit 60 comprising push-buttons for the positive or negative command of each motor M1–M9. These commands have three different functions, which are:

(a) The analog forward/backward command for the synchronization circuits 51, which are not working in a correct electrical shaft mode;

(b) A forward/backward phasing digital command for the synchronization circuits 51 with the connected electrical shaft mode as the microprocessor of the calculating unit II is out of order; and (c) The calling-in command of a correction routine for the microprocessor of the calculating unit II.

Except in case of emergency stop, the logic circuit of the manual command selection circuit must transmit the orders "positive or negative values of the push-buttons" for the selected motors. As far as the selected motors are concerned, the circuit 60 transmits the order "negative values of the push-buttons" only if the signals $V \geqq VL$ or MEM index (FIG. 2) are generated so that no selected units can turn backward. The data sent to the logic manual command selection circuits 60 are:

(a) A signal $V \geqq VL$ generated by the code generator 50;

(b) The emergency stop signal STU provided by the logic starting circuit 59;

(c) The signals $S_2$, $S_3$, $S_4$, $S_5$ and $S_8$ selecting the motors M2, M3, M4, M5 and M8, provided by the logic drive selection circuit 58;

(d) The positive or negative data BM1–BM9 produced by the actuated push-buttons for the manual command; and (e) An index memorization MI.

The data pduced by the logic manual command circuit 60 are primarily the signals BM1–BM9, positive or negative, which data are sent, on the one hand, to the synchronization circuits 51 of the motors M1–M9, and, on the other hand, to the microprocessor 53 of the calculating unit II.

Figure 4:
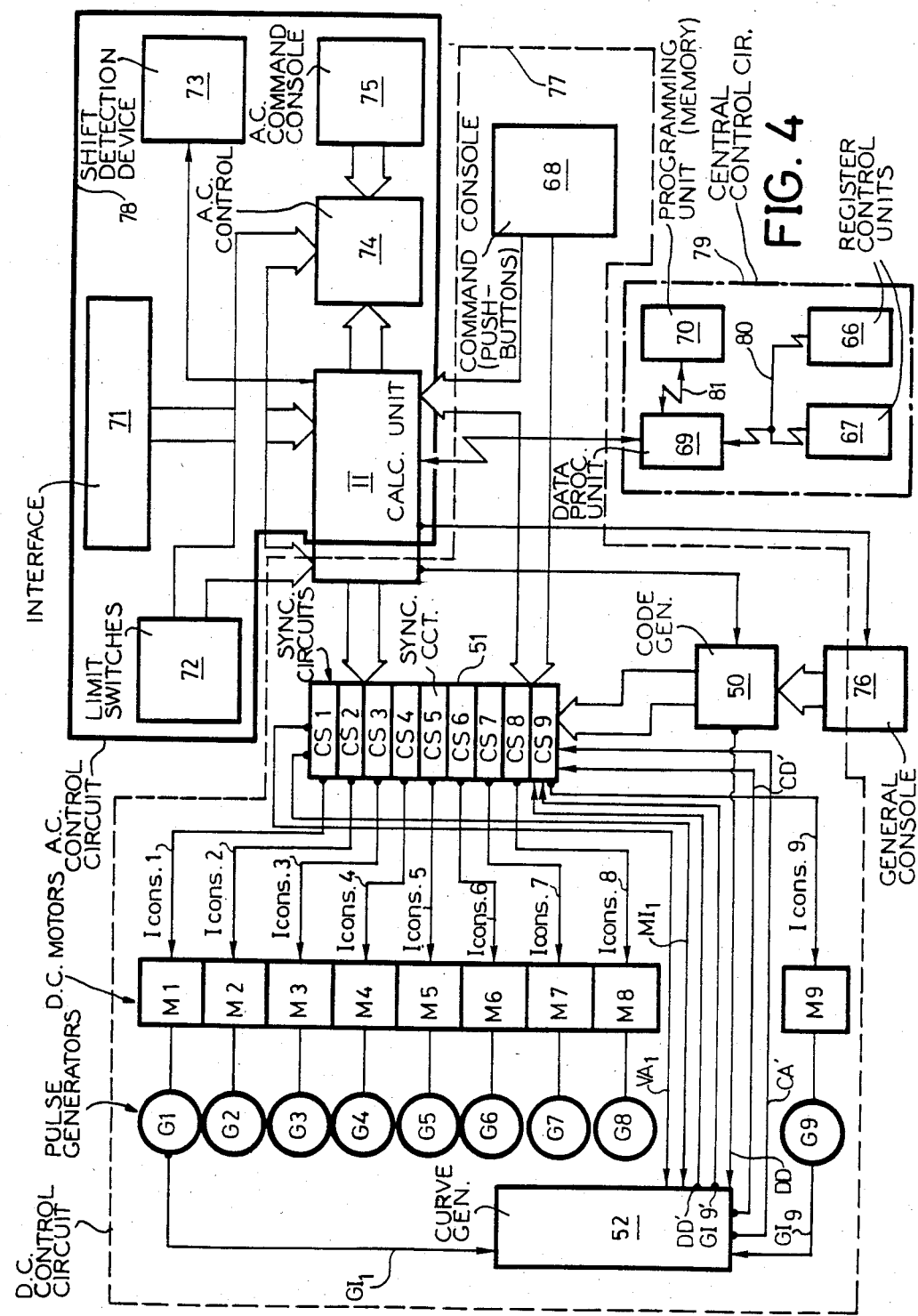
FIG. 4 is a block diagram of the driving devices actuating all of the motors of the machine.
Figure 5:
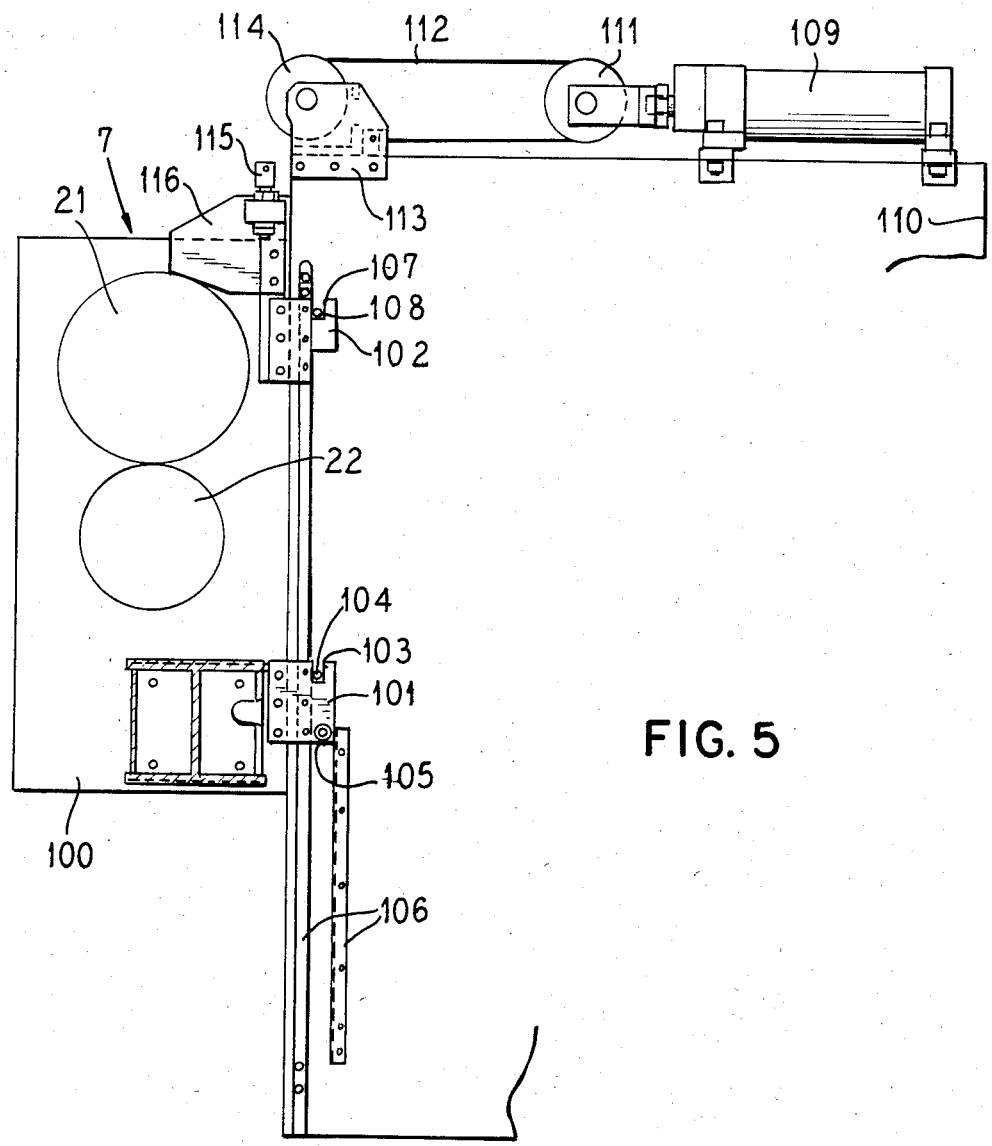
FIG. 5 is a side view of a cutting unit constructed and operating in accordance with the present invention.
Figure 8:
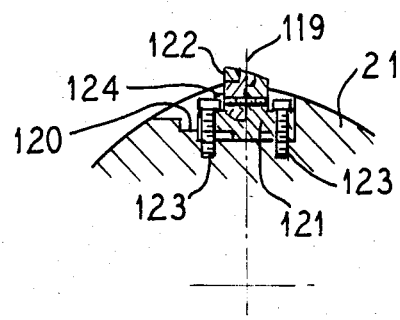
FIG. 8 is a fragmentary sectional view taken along the line VIII—VIII of FIG. 7.
Figure 7:
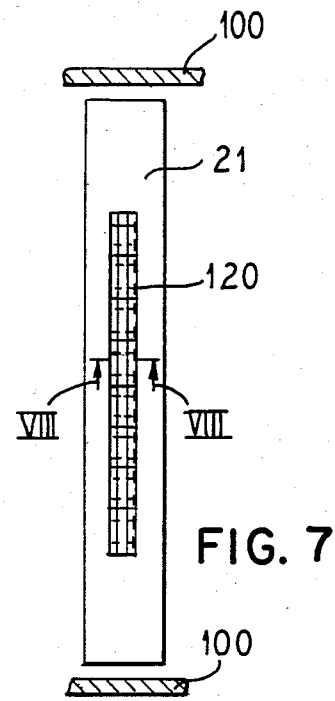
FIG. 7 is a plan view of the upper tool-bearing cylinder of the -cutting station of FIG. 5.
Figure 6:
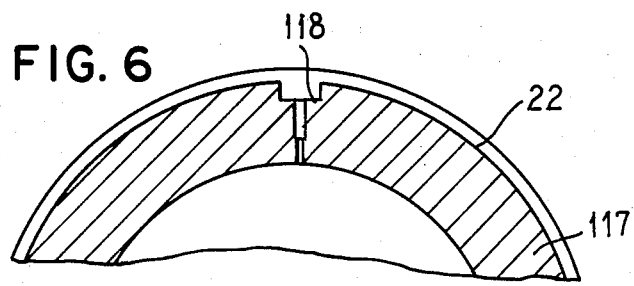
FIG. 6 is a fragmentary sectional view illustrating a portion of the lower anvil of the cutting station of FIG. 5.

FIG. 4 is a diagram of the drive of all motors of the machine, i.e. the connections existing between the various command elements of the D.C. motors M1–M9 and the A.C. motors M20–M24 and M29–M39. The calculating unit II receives specific data from the D.C. motors and A.C. motors. The D.C. motors M1–M9 are controlled by the circuits illustrated in the D.C. control circuit 77 of FIG. 4 enclosed in a broken line, whereas the A.C. motors M20–M24 and M29–M39 are controlled by the A.C. control circuit 78 enclosed within a continuous line. The controls 77 and 78 are commanded by a CTP central control circuit 79 which is enclosed in a dot and dash line. The elements of the control 77 described in FIG. 2 create an electrical shaft coupling between the motors M1–M9, establish the independent phasing of each motor M1–M9, achieve the index setting of all motors, i.e. position them on an identical reference, receive correction orders from the CPT central control circuit 79 while the motors M1–M9 are operating, and control the motor M9 with respect to one of the motors M1–M8. In the present case, the control of the motor M9 refers to the conditions of the motor M1, submitted to identical running conditions as for the motors M2–M8, when the electrical shaft coupling is established. The motor M9, controlled by the motor M1, warrants an independent rotation of the motor M9 during the rotation of the motor M1. The motor M9 drives the pusher 11 (FIG. 1) with a non-linear movement determined by the curved generator 52. The beginning and the end of the non-linear movement absolutely must be registered with the beginning and the end of a rotation cycle of the motor M1. Therefore, the curve generator 52 receives positive or negative pulses $GI_9$ of the pulse generator G9 and digital shifting pulses DD produced by the code generator 50. The very high values of these pulses are processed to be acceptable for the synchronization circuits CS9 of the motor M9, and become the pulses $GI9'$ and $DD'$ at the output of the curve generator 52. The curve generator also receives from the synchronization circuit CS1 of the motor M1 positive or negative pulses $GI_1$, the index setting signal $M1_1$ and analog speed signals $VA_1$ of the motor M1. These values must be processed by elements 40 of the curve generator 52 in order to deliver a positive or negative digital value $CD'$ to be transmitted to the synchronization circuit CS9 of the motor M9. Therefore, the synchronization circuit CS9 of the motor M9 processes the values $CA'$, $CD'$, $DD'$ and $GI9'$ and generates a code current $I_{cons}9$ for the motor M9 which refers to the requested curve for the speed of the motor M9 during one cycle as to the curve of the constant speed of the motor M1 and ensuring, therefore, a perfectly-identical beginning and end of the cycle for both of the motors M1 and M9.

The operation of the D.C. control circuit 77 depends on the elements of the CTP central control circuit 79 for the register control, the processing and the programming. The CTP central control circuit 79 includes a register control unit 66 for the position of the transverse cutting only used with the double size operating mode, a color register unit 67 for the print positions in the printing means 1, 2, 3 and 4, a data processing unit 69 and a programming unit 70. The transverse cutting register unit 66 controls the registration of the cuttings and the prints on the sheet. It calculates the error between the sheet leading edge and a "cutting signal", given by a pulse generator mounted on one of the cylinders 19 or 20 of the first slotting unit. The leading edge detector is located between the printing unit 4 and the first slotting unit (FIG. 1). The information regarding the "cutting signal" is provided by the data processing unit 69. There are two methods for the calculation of an eventual register error correction. The first possibility is to calculate the register error on the basis of an average value measured on several sheet samples, therefore a correction should be done every x sheets. Another possiblity is to detect the position error for each sheet at the entrance of the first slotting unit, and to act immediately on the motors M6, M7, M8 of the slotting units and of the cutting unit 7, so that their angular positions are corrected with respect to the sheet infeed position. The calculation of the error correction on the first sheet is immediate, and the correction will operate simultaneously on the three motors M6, M7 and M8 driving the slotting units and the cutting unit 7. The forward or backward shifting, with respect to the sheet leading edge, can be done manually. During the automatic registration mode, the manual shifting commands of the motor M6 are locked, but the manual shifting commands of the motors M7 and M8 can modify the positions of the slots achieved in the second slotting unit, and of the cuttings performed by the cutting unit 7 with respect to the slots of the first slotting unit.

The color register control unit 67 measures and corrects the eventual register error of the prints achieved in the printing units 1–4. To this end, a pair of optical laser detectors read register marks always located on the same spot on the sheets. A reading aperture for these marks is generated by the detector of the sheet leading edge in the transverse cutting register unit 66. The correction orders are transmitted to the calcating unit II by way of the data processing unit 69, which transmits the signals with respect to the printing units being used.

The correction of the register error is calculated with an average value measured on several sampled sheets, taken off every x sheet. The calculating of the error and correction of the first sheet is immediate. In the automatic working mode of the color registration, the manual shifting commands of the motors M2–M5 are locked. However, the manual shifting commands of the printing units not being used are not locked, and with the help of three pairs of forward/backward push-buttons, the prints of the printing units 2–4 can be shifted with respect to the print of the printing unit 1, which is a reference unit. If an error appears between the print and the sheet leading edge, the motors M1–M9 can be commanded simultaneously and manually by push-buttons. The data processing unit 69 is the interface between the operator and the calculating unit II. This unit also comprises a cathode ray tube (CRT) screen. The data processing unit 69 can, on request:

(a) Call in a job programmed on the programming unit 70;

(b) Feed production data, i.e. box sizes, working speeds, jobs;

(c) Provide a pre-positioning order to the various motors to set the machine according to the data of the job to be achieved;

(d) Control the production;

(e) Calculate the real setting parameters; and (f) Order the programming unit 70 to memorize the production data to be kept, once a job is finished.

The data processing unit 69 also ensures the interfacing between the register control unit 66 for the transverse cutting and the register control unit 67 for color registration and the calculating unit II. The correction order for the units 66 and 67 are directed by the data processing unit 69 to the printing units being used. The two units 66 and 67 will be connected to the data processing unit 69 by a connection element 80, also used to program the reading aperture of the transverse cutting register unit 66 with respect to the box to be manufactured. The data processing unit 69 will also receive from the calculating unit II regular information on the last position of the various D.C. motors and A.C. motors of the machine. These data are kept in protected memories belonging to the unit 69 so that a new start can easily be ordered if the synchronization of the motors M1–M9 is lost, in case of an emergency stop, for example. These data are provided from the machine and are able to generate a production diary, i.e. machine started, correct running of the sheets, production speed, etc, and are also transmitted to the unit 69 by this bus. The program unit 70 is connected to the data processing unit 69 by a connection 81. The program unit 70 can:

(a) Program new working data about the size and the shape of the boxes, the thickness of the material, and the list of colors used for printing;

(b) Check the jobs done in a potective memory, the data concerning the finished jobs, with all the corrections given during the job, and the production diary, etc.; and (c) Control the stock list of the jobs kept and information concerning the spare space still available in the memory.

The various manual commands of the D.C. motors M1–M9 initiated by push-buttons are located on the same console, comprising the general console 76 and the command console 68 for the D.C. motors. The A.C. control circuit 78 illustrates the elements which manage the operation of the A.C. motors M20–M24 and M29–M39 for the lateral positioning of the various elements of the stations. Therefore, the A.C. control circuit 78 comprises an interface 71 for the connection of the pulse generator of the A.C. motors with the calculating unit II. The interface 71 transforms the data delivered by the pulse generators of the A.C. motors into a range of pulses and a signal giving the rotation sense of the motors. At each pulse, a processing routine provides a shifting direction and the beginning of the information. Therefore, the lateral position of each element of the various stations can be determined and controlled. The A.C. control circuit 78 also has terminal switches 72 for:

(a) Securing the operating security by locking the A.C. motor corresponding to the switch actuated when the switches 72 act on the A.C. control 74 of the A.C. motor; and (b) Reset the element of the various stations into their original positions, when the positions of these elements is not known without absolute accuracy.

This can be done when the switches 72 act on the calculating unit II. All of the elements of the machine are then shifted until they are stopped by their respective switches; then, they are reset to the references memorized by the memory unit 70 at the start of the job. The A.C. control 74 of the A.C. motors receives orders from the calculating unit II and the A.C. command console 75. However, a shifting order can be locked either by the terminal switches 72 or an emergency stop of the machine. The A.C. control circuit 78 also comprises a control device 73 which is a shift detection device which establishes if the shifting of the elements of the stations ordered and controlled by the calculating unit II actually took place, when the calculating unit II was out of order. The control device 73 is a flip-flop circuit. When the calculating device II is started, it first detects the state of the flip-flop circuit. If this detection shows that a manual shifting occurred without control by the calculating unit, the resetting of the initial command conditions must take place before any new start. If, on the contrary, the detection shows that no shifting occurred, the calculating unit II immediately orders the start of the command device. Therefore, the operator has a driving device for the various motors of the machine for manufacturing boxes, allowing the free setting of the instant angular posions of all motors, this being done independently for each motor. Such a device can overcome the difficulty of obtaining a perfectly-accurate operation by the suppression of all mechanical perturbations of the drive systems heretofore known.

For a more detailed view of the structure set forth above, reference is now made to FIGS. 5–14 which illustrate operating elements of the machine.

Referring to FIGS. 5–8, the cutting unit 7 of the cutting station D is illustrated as comprising an upper tool-bearing cylinder 21 facing a lower anvil cylinder 22. The cylinders 21 and 22 are mounted between two lateral flanges 100 carrying the guide members 101 and 102. The guide members 101 and 102 comprise a recess 103 engaging a rod 104 when the cutting unit 7 is in its upper position. A roller 105 is fitted onto a guide member 101 and acts jointly with a guide rail 106 to allow guidance of the cutting unit 7 when raising. The guide member 102 is also equipped with a recess 107 which receives a rod 108 when the cutting unit 7 is in its upper position. The vertical motion of the cutting unit 7 is achieved by a pneumatic or hydraulic piston 109 carried on a frame 110 and equipped with a roller 111 which is entrained by a cable 112 with a roller 114, the cable 112 having one end fixed to a lug 113 and the other end attached to a connecting piece 115 carried on a plate 116 mounted at the upper end of the lateral flanges 100.

The lower anvil cylinder 22 may comprise a metal tube 117 including a recess 118 extending parallel to the longitudinal axis for receiving the cutting blade 119 of the upper tool-bearing cylinder 21 when no transverse cutting operation takes place. This is achieved by angularly displacing the position of the lower anvil cylinder 22 with respect to the upper tool-bearing cylinder 21. The tool-bearing cylinder 21 comprises a groove 120, as set forth above, which receives the tool bearer holding the cutting blade 119. The tool bearer may comprise fixing members 121 and 122 mounted in the groove by way of screws 123 and a screw 124 for pinching the cutting blade 119 between the fixing members 121 and 122.

Figure 9:
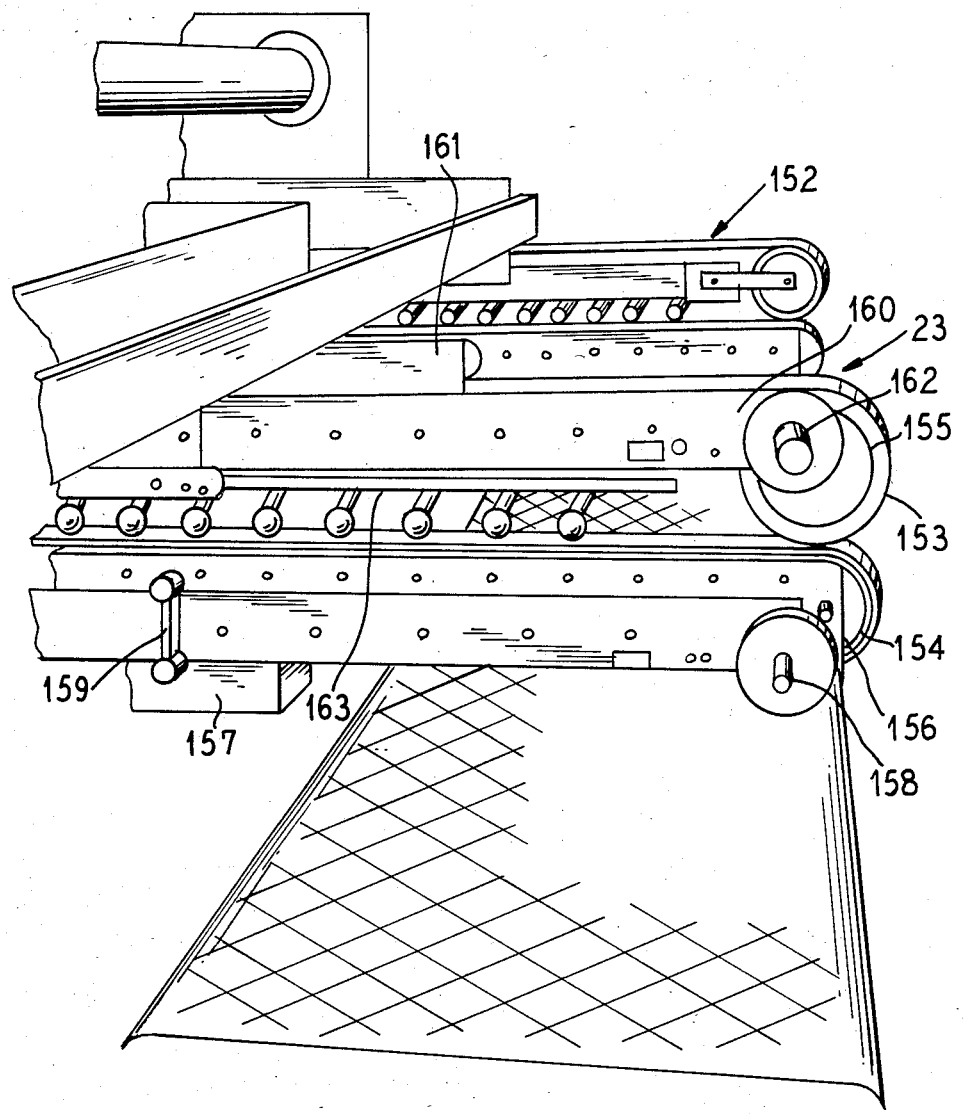
FIG. 9 is a pictorial representation of a telescopic conveyor having two sets of belt conveyors.

FIG. 9 illustrates the telescopic conveyor 23 shown in the folding-gluing station E of FIGS. 1 and 1a. The conveyor 23 comprises two sets of belt conveyors 152 and 153 each of which is formed by a lower conveyor 154 and an upper conveyor 155. The lower conveyor 154 comprises a pair of flanges located on either side of the belt supporting arrangement of pulleys and rollers, the two flanges 156 being designed to slide along a beam 157 after release of a locking device 159 and movement of the hand grip 158. The upper conveyor 155 also comprises two flanges 160 supporting a similar arrangement of pulleys and rollers. The conveyor 155 is hung from a beam 161 and is slidable therealong by movement of the hand grip 162 upon release of the locking device 159. In order to ensure good transport of the cardboard sheets between the conveyors, a set of pressure rollers 163 is mounted under the flange members 160.

Figure 10:
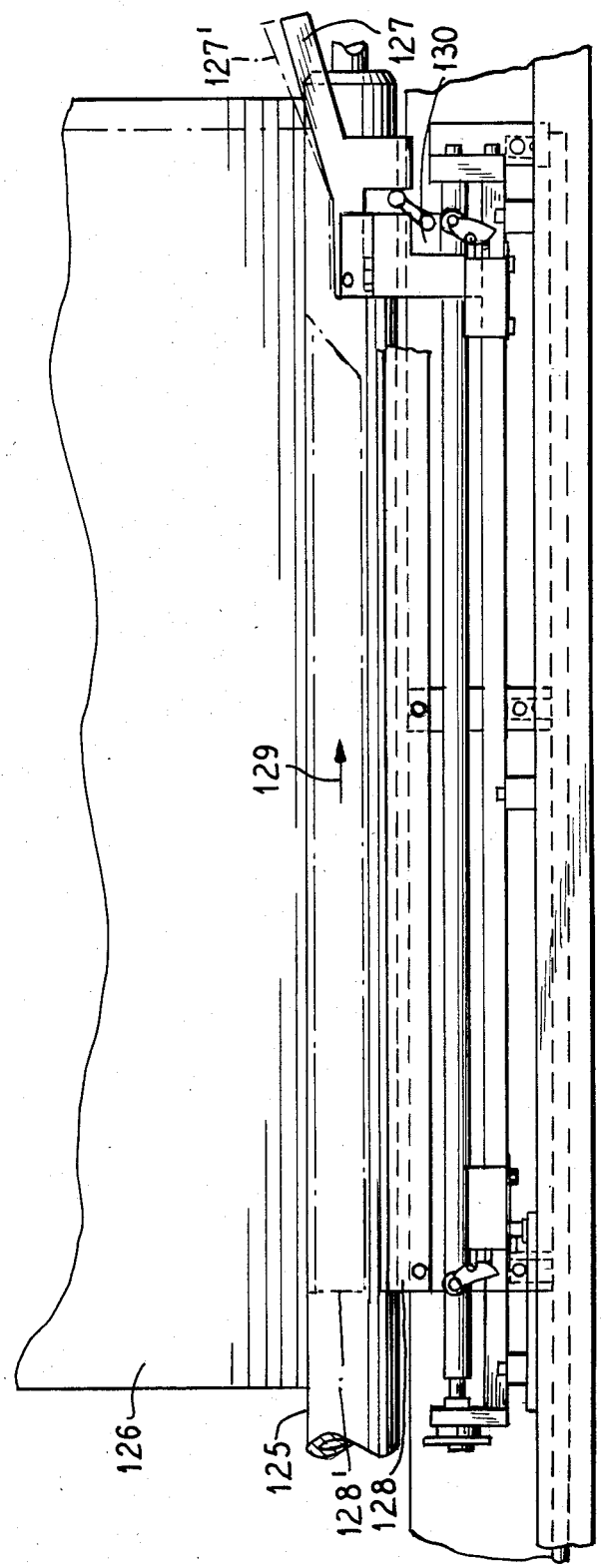
FIG. 10 is a plan view of the pile centering structure.

Referring to FIG. 10, the pile or stack centering structure of the feed station A is illustrated as comprising conveyor rollers 125 supporting a pile of cardboard sheets 126. At the beginning stage of operation, the lateral stop 127 is located in a position 127' and the pile 126 lies on a pile support 128 in its raised position. The support 128 is displaced in the direction of an arrow 129 in order to urge the lateral stop 127 down to operate a switch 130 to stop lateral movement of the support 128. The support 128 lowers and is then pulled back in its lower position to permit the pile 126 to engage the conveyor rollers 125 in a centered location.

Figure 11:
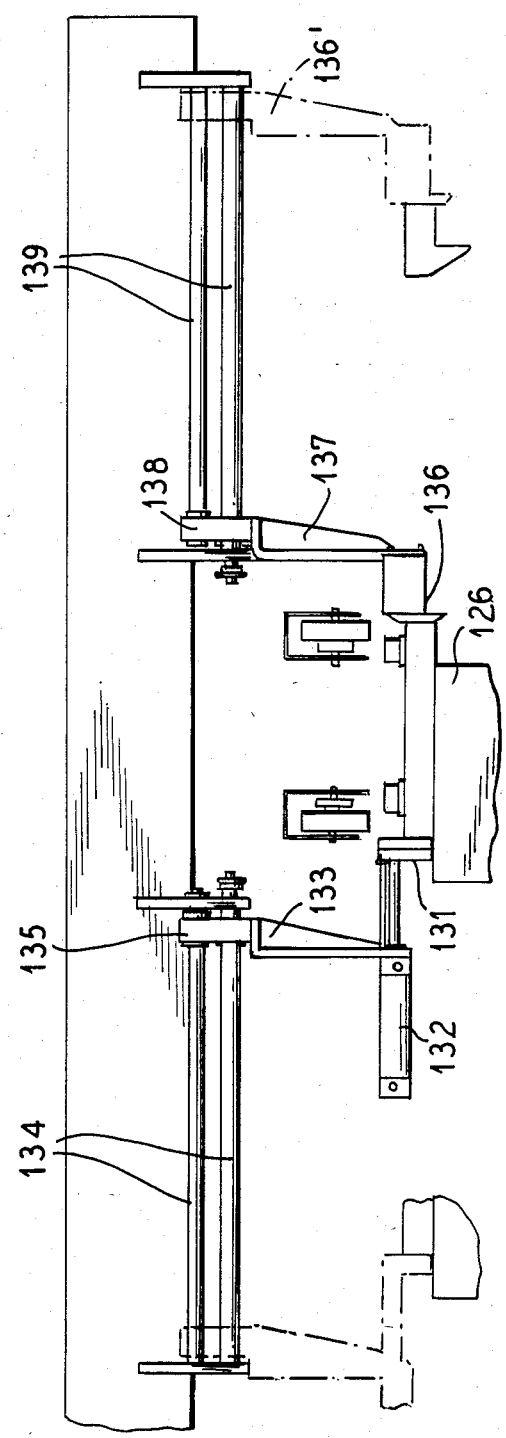
FIG. 11 is a plan view of the squaring structure of the upper portion of the pile.

In FIG. 11, the squaring device of the upper portion of the pile 126 is illustrated as comprising a movable stop 131 mounted at the end of a pneumatic or hydraulic piston 132 supported by a member 133 connected to a pair of guide rods 134. To set the position of the member 133 with respect to the size of the cardboard sheets a bearing 135 may be shifted along the guide rods 134, one of the guide rods being constructed as a screw engaging a nut in the bearing 135 (see the position 133'). The movable stop 131 acts jointly with an adjustable stop 136 mounted to another member 137 connected to a bearing 138. The assembly is supported by rods 139, again one of which is constructed as a screw engaging a suitable nut in the bearing 138 in order to adjust the lateral position of the stop 136 with respect to the size of the sheet, the maximum position being illustrated at 136'.

Figure 12:
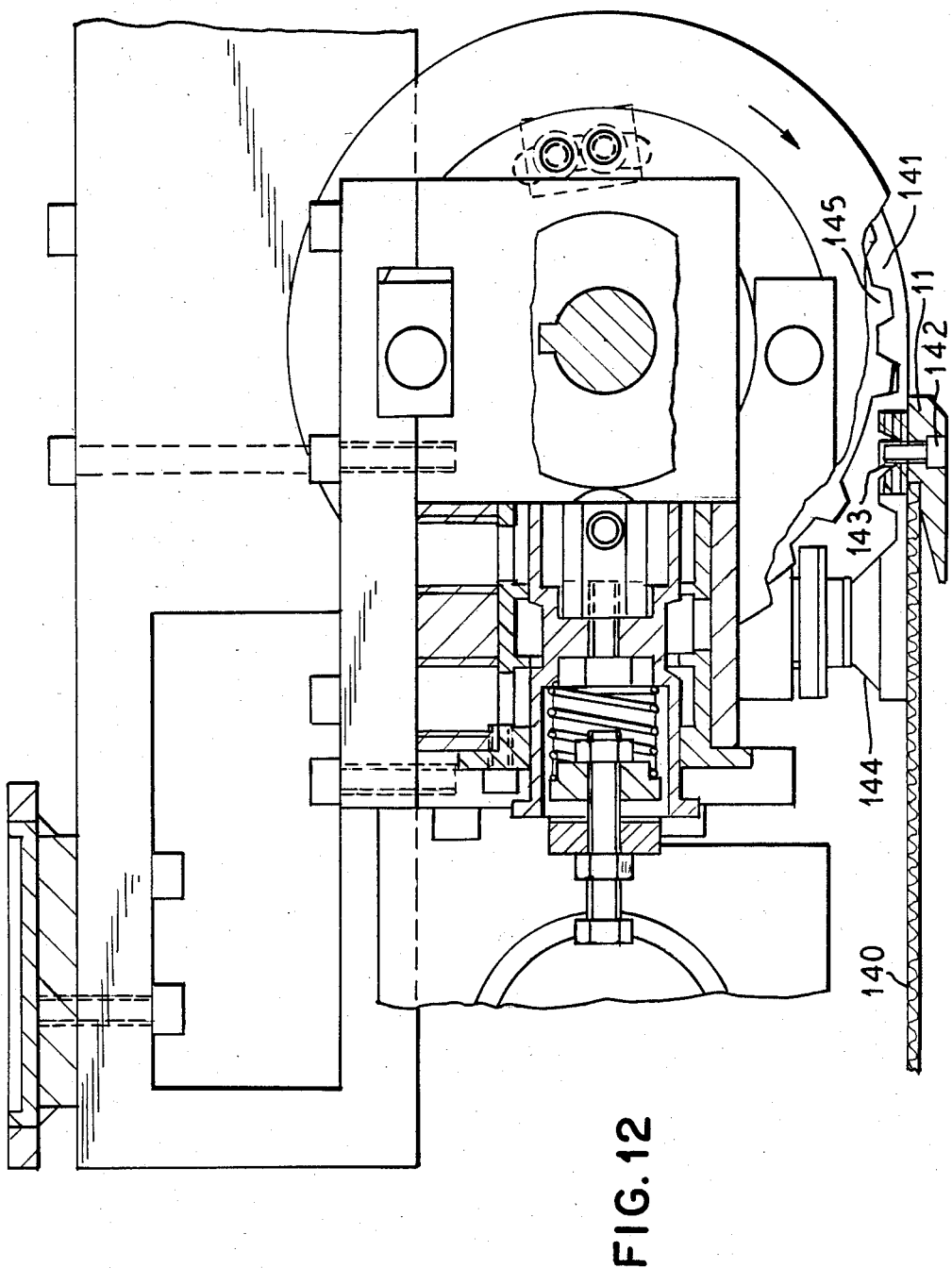
FIG. 12 is an end view, shown partially in section, of dredge type pushers mounted on a toothed belt.

In FIG. 12, the dredge-type pushers 11 of FIG. 1 is illustrated as mounted on a tooth belt 141 by way of a screw 142 and a nut 143. Two pushers 11 are fixed onto the toothed belt 141 diametrically opposite one another. Immediately adjacent the tooth belt 141 is a sucker 144 for picking up the sheet 140 just before the picture 11 engages its trailing edge.

Figure 13:
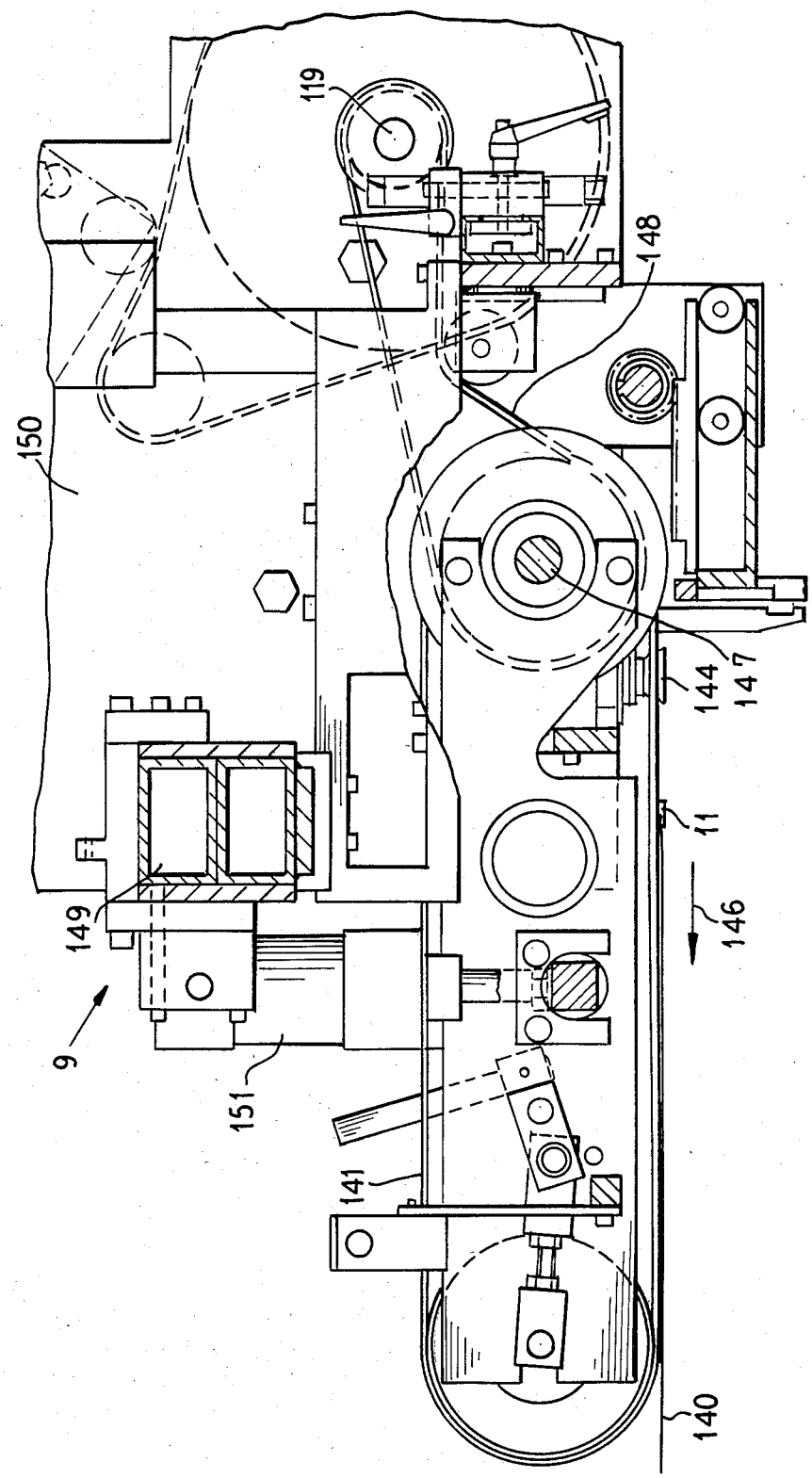
FIG. 13 is a side view illustrating the general configuration of the dredge of the feeder of FIG. 1.

In FIG. 13, the general configuration of the dredge of the feeder 9 is illustrated. The toothed belt 141 is continuously driven by a pulley 145 (also shown in FIG. 12) in order to feed the sheet 140 in the direction of the arrow 146. The motion of the motor M9 (FIGS. 1a, 2 and 4) is transmitted to the shaft 147 of the pulley 145 by another toothed belt 148. The feeder 9 of the feed station A of FIGS. 1 and 2 is supported by a beam 149 extending transversely between the lateral frame 150 of the machine. A device comprising a hydraulic piston 151 is provided to raise the feeder when a jam occurs.

Figure 14:
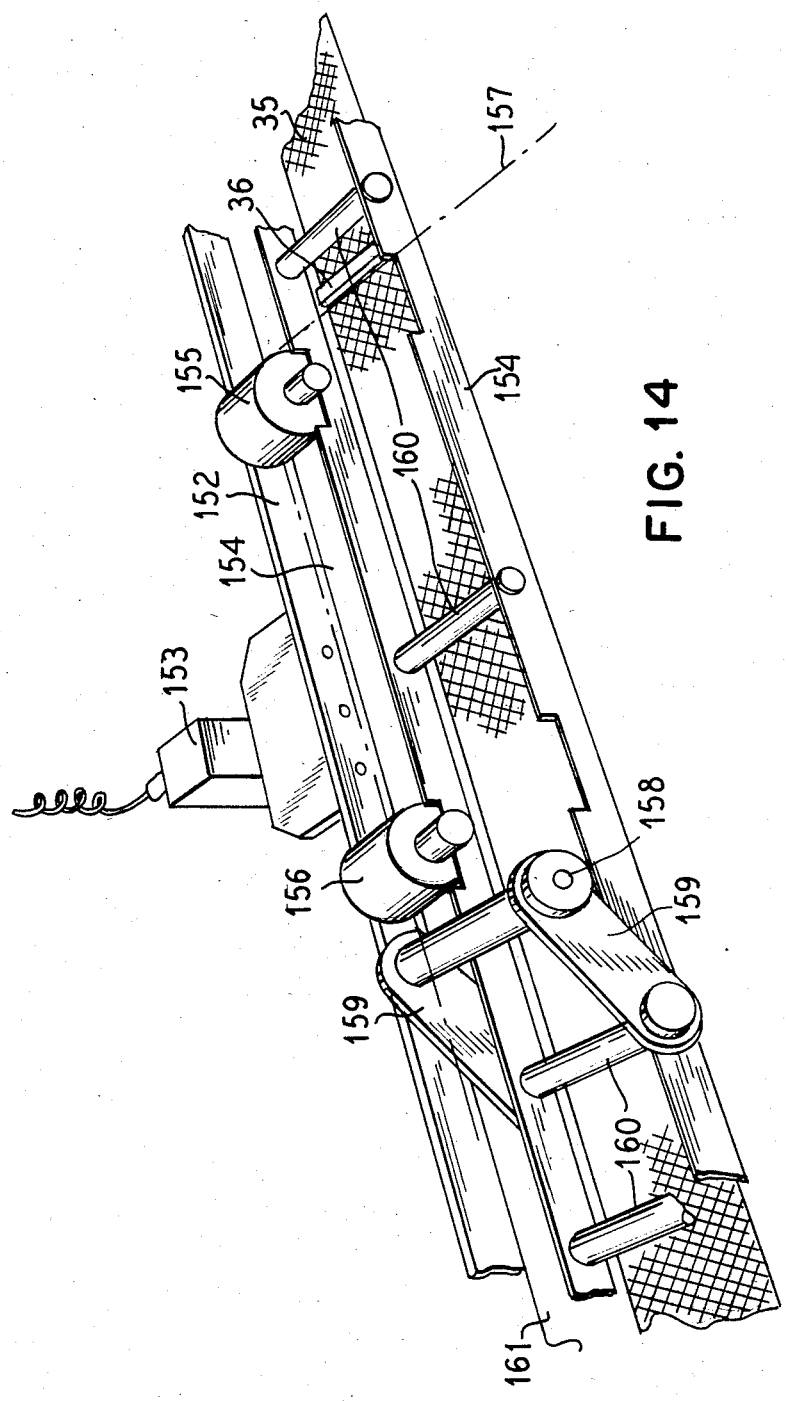
FIG. 14 is a perspective view of the lateral operating pushers and push lugs of the centering structure of a positioning station.

The lateral operating pushers and push lugs are illustrated in FIG. 14 for the positioning station B. A sheet 157, symbolically indicated by a dot-dash line, is fed from the feed station A and pushed forward from its rear edge by way of a finger 36 (also shown in FIG. 1) mounted on a grooved belt 35. The lateral alignment of the sheet is achieved by a guide 152. The position of the guide 152 is adjusted by a setting motor 153. The sheet 157 is maintained in a suitable position by the joint action of a lower plate 161 and an upper member comprising two upper guides 154 spaced apart from one another by a plurality of members 160. The upper members is hung by two sets of levers 159 attached to the upper guide 154 and to a pivot point 158. A set of rollers 155 provide guidance of the lateral edge of the sheet 157. A plurality of the fingers 36 are mounted on the belt 35 and the second conveyor of the positioning station B is designed on the same principle with the adjustable guide 152 being spring mounted.

The register control may advantageously be provided by a Bobst-Registron S2000 system available from Registron Bobst Champlain, Inc., Roseland, N.J.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A machine for manufacturing folded boxes with sheet material, comprising:

a plurality of successive stations operating in synchronism, including a feed station, a centering station, a printing station, a cutting station, a folding and gluing station and a stacking and delivery station;

said feed station including stack receiving means for holding a stack of sheets, stack feeding means for feeding a stack to said stack receiving means, stack centering means for centering a received stack with respect to the center line of the machine, and first feed means for feeding the uppermost sheet of the stack to said centering station;

said centering station including set centering means for centering a sheet with respect to the center line, and second feed means for feeding a centered sheet to said printing station;

said printing station comprising a plurality of selectively operable printing units including printing cylinders positioned to print on the bottom surface of a sheet;

said cutting station comprising first and second successively operating cutting units for slotting a sheet along predetermined fold lines and for cutting a sheet to a predetermined form, said second cutting unit mounted for movement to a non-working position;

said folding and gluing station comprising a telescopic conveyor to be extended into the working space of said second cutting unit when the same is in its non-working position, a folder for folding a sheet along the predetermined fold lines, and a gluer for gluing together opposite transverse marginal portions of a folded sheet to form a box form;

said stacking and delivery station comprising stacking means for stacking the box forms, counting means for counting the stacked forms, and stack conveying means for conveying a stack out of the machine in response to said counting means reaching a predetermined count;

a plurality of D.C. motors connected to and driving said stations in synchronism;

lateral shifting means in each of said stations;

a plurality of asynchronous A.C. motors connected to and operable to shift said lateral shift means at each of said stations; and a machine control system including a program and data processing control circuit for storing and processing operating parameters of the machine, a register control circuit for sensing sheet registration and producing corresponding data, a D.C. control circuit connected to said D.C. motors for controlling synchronism and registration, and an A.C. control circuit connected to said A.C. motors for controlling lateral sheet displacement.

2. The machine for making folded boxes of claim 1, wherein:
said stack feeding means comprises an elevator operable to lift a stack and maintain the uppermost sheet at a feed-in level;
said stack centering means comprises lateral stops for receiving and centering a stack therebetween;
squaring means are provided for squaring the upper portion of the stack, said squaring means comprising a fixed lateral stop on one side of the stack and a cyclically movable stop on the other side of the stack;
said first means comprises a feeder including cyclically effective dredge-type pushers;
said sheet centering means comprises lateral operating pushers;
said second feed means comprises chains carrying cyclically-effective push lugs; and
said second cutting unit comprises an upper cutting cylinder and a lower anvil cylinder for receiving a sheet therebetween, said lower anvil cylinder including a transverse groove and said upper cutting cylinder including a transverse knife which is angularly shiftable with respect to the axis of the upper cutting cylinder for receipt in said transverse groove.

3. The machine for making folded boxes of claim 2, wherein:
said D.C. control circuit comprises a command unit, a calculating unit, a signal conditioning unit and a logic command unit;
said register control circuit comprises a register control unit for sensing the position of and controlling the position of said transverse knife with respect to the leading edge of a sheet, a color register unit for sensing and controlling color registration in said printing station, a data processing unit, and a program unit; and
said A.C. control circuit comprises an interface, a plurality of terminal switches, a portion of said calculating unit, a shift detection control device, an A.C. command console for delivering shift orders, an A.C. command circuit for delivering shift orders from said calculating unit and said A.C. command console to said A.C. motors; and
said D.C. motors being connected with one another by an electrically coupled shaft.

4. The machine for manufacturng folded boxes of claim 3, wherein said command unit comprises:
a code generator and a plurality of synchronization circuits for each of said D.C. motors connected to said code generator, and a curve generator for one of said D.C. motors;
said calculating unit comprises a microprocessor, input/output circuits and an input circuit including data input switches;
a pulse generator is provided for each of said D.C. motors;
said signal conditioning unit comprises a discriminator and a pulse multiplier for the pulses of said generators, and means for conditioning signals for the interfacing and processing of signals generated by said command unit; and
said logic command unit comprises a logic driving selection circuit, a logic starting circuit and a logic manual command circuit.

5. The machine for manufacturing folded boxes of claim 4, wherein:
said code generator comprises a counter/decoder, a digital/analog converter, a code generator, a voltage/frequency converter, a frequency generator and a comparator;
said synchronization circuits each comprise an adder, a speed regulating loop, a speed regulator, a position regulating loop with a counter/decoder, a digital/analog converter, a position regulator and a command logic; and
said curve generator comprises a binary counter/decoder, a memory, a multiplier, a dider and a command logic.

6. The machine for manufacturing folded boxes of claim 5, wherein:
said curve generator is connected with said synchronization circuit of said one motor, on the one hand, and with one of said synchronization circuits of another of said motors driven by said shaft, on the other hand.

* * * * *